Feb. 19, 1952 J. M. DORTON 2,586,013
COMBINED SPRING SEAT AND BACK STRUCTURE
Filed Oct. 18, 1947 2 SHEETS—SHEET 1
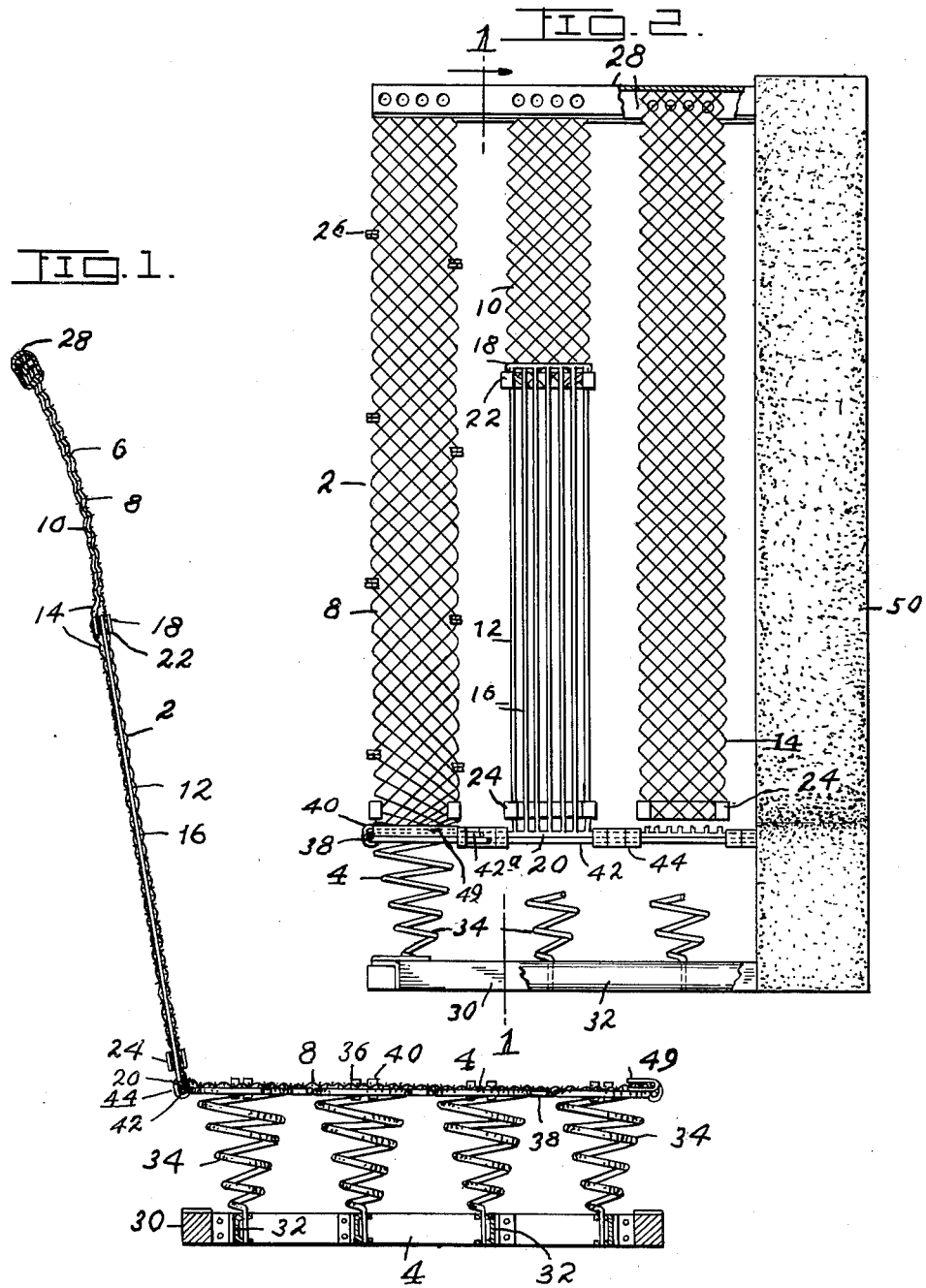
INVENTOR.
John M. Dorton,
BY
F. G. Fischer,
ATTORNEY.

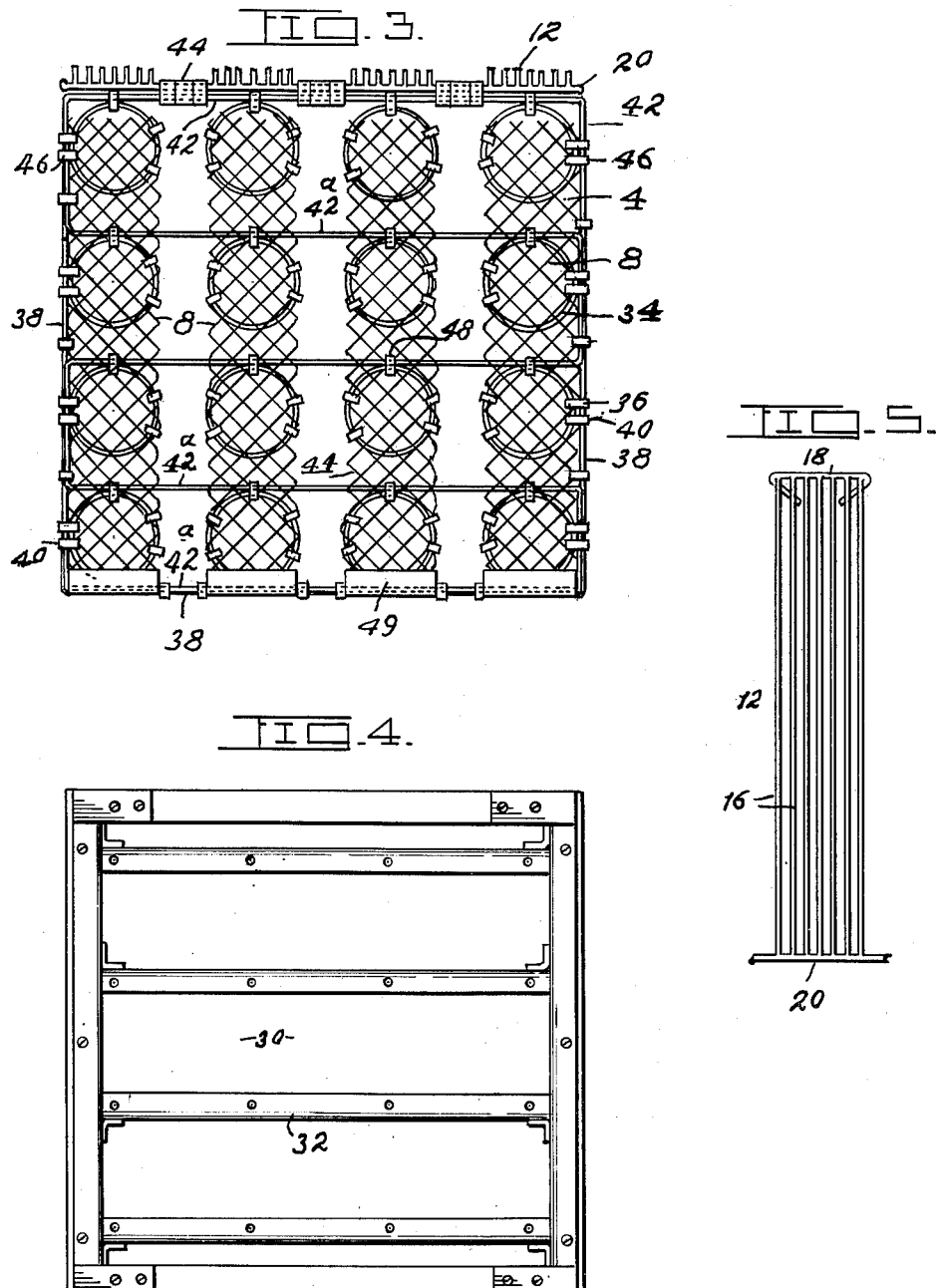

Patented Feb. 19, 1952

2,586,013

UNITED STATES PATENT OFFICE 2,586,013

COMBINED SPRING SEAT AND BACK STRUCTURE

John M. Dorton, Bonner Springs, Kans.

Application October 18, 1947, Serial No. 780,625

4 Claims. (Cl. 155—53)

My invention relates to the construction of seats and backs for chairs, vehicles, airplanes and the like, and the present invention relates more particularly to the combination and peculiar arrangement and assembly of a plurality of woven wire strips whereby great strength, light weight and flexibility is obtained in such seats and backs.

By the use of my novel construction, combination and arrangement of woven wire strips a simple, durable and flexible construction is provided which can be quickly and economically assembled, and in order that the invention may be fully understood reference will now be had to the accompanying drawings, in which:

Fig. 1 is a vertical sectional view taken on line 1—1 of Fig. 2, of a combined seat and back structure embodying parts of my wire structure.

Fig. 2 is a front elevation of the combined seat and back structure showing the different woven wire strips that form important features of the invention, part of the front portion of the seat being broken away to show part of the rear portion and the manner in which it is connected to the lower end of the back structure.

Fig. 3 is a plan view of the seat with the base thereof omitted.

Fig. 4 is a detail plan view of the seat base.

Fig. 5 is a detail of one of a plurality of reinforcing members for the back structure.

Referring in detail to the different parts, 2 designates the back and 4 the seat, which former embodies a plurality of woven wire units 6 arranged in parallelism and spaced apart as disclosed by a number of the strips, Fig. 2. Each unit 6 comprises a combination of parts, including a long front woven wire element 8, an intermediate short woven wire element 10, a reinforcing member 12, and a rear woven wire element 14. To avoid confusion of lines which would probably occur if complete units 6 were disclosed by Fig. 2, I have shown the woven wire elements separately from left to right, beginning with the long front element 8, followed by the short element 10 with member 12, and ending with the rear wire element 14.

Each long front element 8 reaches from the top of the back structure 2 to the front end of the seat structure 4. The intermediate short element 10 is interposed between the upper rear portions of the front elements 8 and the rear element 14, which latter extends the full length of the back structure 2. Each reinforcing member 12 comprises a plurality of spaced parallel rods 16 united at their upper and lower ends by transverse rods 18 and 20, respectively. The upper end of the member 12 is connected to the lower end of the associated intermediate element 10 by a transverse fastening member 22 and the transverse rod 18; the lower end portion of member 10 being wrapped about or otherwise suitably secured to member 22, the ends of the member 22 being folded over the front of the sidemost rods 16, and the ends of the rod 18 being folded over the longitudinal margins and against the back of the element 10. The lower ends of the rods 16 are united by the transverse rod 20, which is hinged to the upper rear portion of the seat 4, as will presently appear.

The lower portion of the reinforcing member 12 is connected to the front and rear elements 8 and 14, respectively, by a transverse fastening member 24, the lower end portion of member 14 being wrapped about or otherwise suitably secured to member 24 and the end portions of member 24 being folded forwardly and inwardly to grip member 8. The longitudinal margins of the elements 8, 10 and 14 are connected together at intervals by suitable means such as clips 26. The upper ends of the units 6 are secured in spaced relation to each other by a transverse clamp 28.

By forming each unit 6 of a plurality of individual woven wire elements 8, 10 and 14 and the member 12, ample strength and flexibility is obtained to support any pressure likely to be imposed against the back structure 2, when the latter and seat structure 4 are in use. The upper portion of the back structure 2 may be curved in any desired manner, preferably as shown by the back structure disclosed by Fig. 1 and Fig. 2 of my Patent No. 2,529,726, issued November 14, 1950. Any suitable frame may also be provided for supporting the back structure at different inclinations.

Considering now the construction of the seat structure 4, 30 designates an open rectangular base reinforced by spaced transverse members 32, upon which a plurality of helical springs 34 are mounted. The springs 34 are arranged in rows beneath the long woven wire elements 8, to which the upper coils of the springs are secured by suitable means such as clips 36, the lower coils of the springs being welded or otherwise suitably secured to the respective transverse members 32.

The seat structure 4 is reinforced with a cable 38 which extends around the upper portions of the front and sides of the seat structure as best shown by Fig. 3, and is secured to the upper convolutions of the adjacent helical springs 34 and outer margins of the two sidemost wire elements 8 by clips 40. The opposite rear ends of the cable 38 are welded or otherwise firmly secured to the forward ends of a U-member 42, preferably made of wire hingedly connected to the transverse element 20 by loops 44. The sides of the U-member are secured to the adjacent upper coils of the springs 34 by clips 46.

The elements 8 and the upper ends of the springs 34 are restrained from undue lateral movement by a cable 42a, which is run in a somewhat zigzag manner back and forth across the seat and secured by clips 48 to the elements 8 and the upper coils of the spirngs 34.

Clamps 49 are employed for securing the front portions of the springs 34, woven wire elements 8, and cables 38 and 42a together. The seat and back structures are covered with suitable upholstery 50.

By combining the woven wire elements 8, 10 and 14, and the members 12 in the manner above described to form the units 6, it is apparent that the back structure 4 will be light, strong and flexible.

It will be understood that I have provided an improved back and seat structure, and while the form of the invention herein disclosed constitutes a preferred form, it is to be understood that changes and modifications may be made falling within the scope of the invention as claimed.

Having thus described my invention, what I claim and desire to secure by Letters Patent, is:

1. In a combined seat and back structure, a seat, a plurality of units spaced apart and arranged in parallelism, each unit including a long woven wire element secured to and extending over the seat from front to rear and thence upwardly to form a portion of a back member, short woven wire elements arranged at the rear of the respective long wire elements and extending downwardly a suitable distance from the upper ends thereof to form part of the back structure, means for securing the upper ends of the respective long and short wire elements together, and means for securing the longitudinal margins of the long and short wire elements together.

2. In a combined seat and back structure, a seat, a plurality of units spaced apart and arranged in parallelism, each unit including a long woven wire element secured to and extending over the seat from front to rear and thence upwardly to form a portion of a back member, short woven wire elements arranged at the rear of the respective long wire elements and extending downwardly from the upper ends thereof a suitable distance, means for securing the respective long and short elements together, woven wire elements arranged at the rear of the respective short and long elements and forming parts of the back, and means for securing the elements of each unit together.

3. In a combined seat and back structure, a seat, a plurality of units spaced apart and arranged in parallelism, each unit including a long wire element secured to and extending over the seat from front to rear and thence upwardly to form a portion of a back member, short woven wire elements arranged at the rear of the respective long wire elements and extending downwardly from the upper ends thereof a suitable distance, a reinforcing member secured to the lower end of each short woven wire element, woven wire elements arranged at the rear of the respective short wire elements and the reinforcing members, and means for securing the different elements and reinforcing member of each unit together.

4. In a combined seat and back structure, a seat, a plurality of units spaced apart and arranged in parallelism, each unit including a long wire element secured to and extending over the seat from front to rear and thence upwardly to form a portion of a back member, short woven wire elements arranged at the rear of the respective long wire elements and extending downwardly from the upper ends thereof a suitable distance, a reinforcing member secured to the lower end of each short woven wire element, and hinge means operably connecting the lower ends of the reinforcing members and the rear portion of the seat together.

JOHN M. DORTON.

REFERENCES CITED

The following references are of record in the file of this patent:

UNITED STATES PATENTS

| Number | Name | Date |
|---|---|---|
| 434,495 | Woods | Aug. 19, 1890 |
| 1,032,243 | Robertson | July 9, 1912 |
| 1,203,293 | Wilkinson | Oct. 31, 1916 |
| 1,952,880 | Mayhew | Mar. 27, 1934 |
| 1,963,670 | Nemmer | June 19, 1934 |
| 2,265,251 | Reed | Dec. 9, 1941 |
| 2,281,341 | Turner | Apr. 28, 1942 |
| 2,313,130 | Dorton | Mar. 9, 1943 |

FOREIGN PATENTS

| Number | Country | Date |
|---|---|---|
| 559,461 | Germany | Sept. 21, 1932 |